United States Patent Office 3,380,308
Patented Apr. 30, 1968

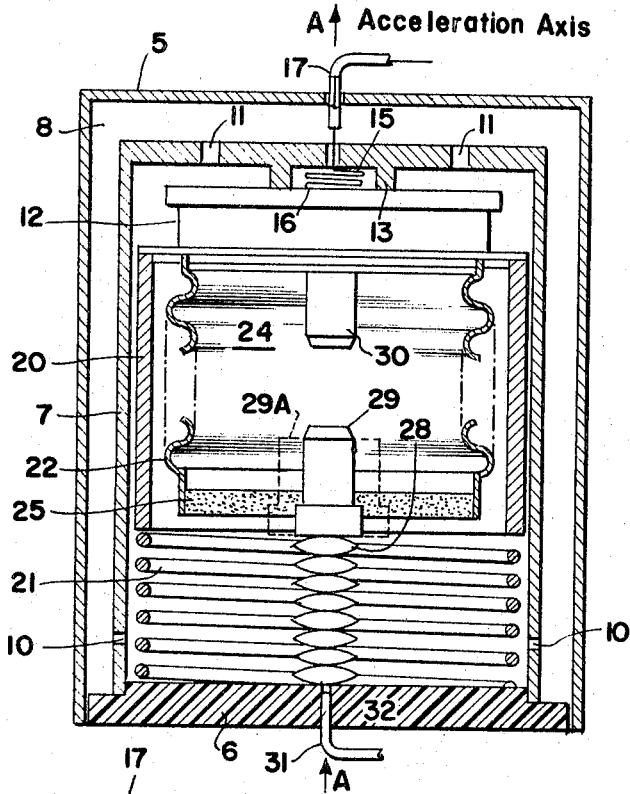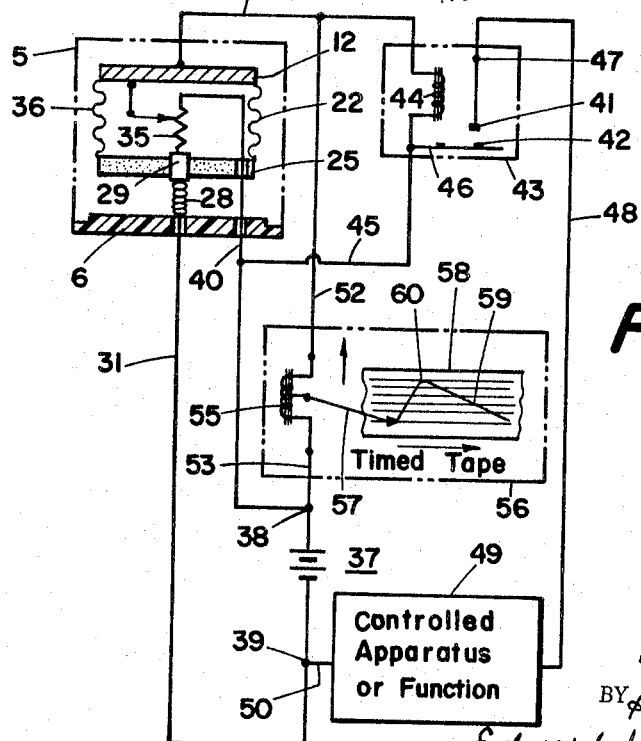

3,380,308
INTEGRATING ACCELEROMETER
Arthur R. Burch, Minneapolis, and James H. Snyder, Minnetonka Village, Minn., assignors, by mesne assignments, to the United States of America as represented by the Secretary of the Army
Filed Aug. 27, 1965, Ser. No. 483,383
4 Claims. (Cl. 73—503)

ABSTRACT OF THE DISCLOSURE

An integrating accelerometer device having an inertially-movable piston element mounted in a cylinder oriented axially on the movement or flight axis and connected at one end of a bellows element to move therewith coaxially from a normal seated position and provide a compression force on the air therein. A fixed porous orifice disk provides a closure means for the opposite end of the bellows element and leakage through which the compression force on the air therein is gradually released. Electrical contact means, carried by the orifice disk for electrical circuit control in connection with fixed electrical contact means connected with the piston element, blanks part of the orifice area to control the leakage rate and timing, and a cylindrical spring-loaded inertial reset weight contacts the piston and resiliently holds it in the seated position prior to operational movement, when it releases the piston element.

---

The present invention relates to devices for measuring acceleration or rate of change of movement of vehicles, missiles, projectiles and like bodies in motion and the reactive movement of missile and projectile firing apparatus and the like. As is known such devices have an operating axis which is aligned with the axial movement of the vehicle, missile, projectile or other body by which it is carried.

It is a primary object of this invention to provide an accelerometer device that integrates acceleration to yield velocity which can be used as a safe velocity or safe distance device.

It is also an object of this invention to provide an integrating accelerometer device of the above type which preferably utilizes air as a damping medium, and which is adapted to meter the air flow at a rate depended on the vehicle acceleration.

It is a still further object of this invention to provide an improved accelerometer which is substantially a pure integrator and not a proportional device which is characteristic of several known devices of this type.

It is also a further and important object of this invention to provide an improved accelerometer of the above type which is of simplified and low cost interior construction while being highly effective and accurate in operation.

In accordance with one form of the invention, a set-back or interial piston element moves on the acceleration axis to force air, as the damping medium, through an improved orifice element which can be accurately calibrated at low cost. The piston element is permitted to move in response to releasing movement of a reset weight or inertial mass in the form of a cylindrical plunger. The plunger is free loaded in one direction by a spring acting also along the acceleration axis and is movable against the spring pressure in response to acceleration movement of the body by which the device is carried.

Because the spring loaded reset weight is not attached directly to the piston element, the device becomes a pure integrator and not a proportional device. The air passing through the improved orifice is metered at a rate dependent upon the vehicle acceleration. The result is a device that integrates acceleration to yield velocity which can be used as a safe velocity or safe distance measurement. The utilization of air as a damping medium has the advantage that the viscosity change of air with temperature is very much smaller than that of any oil medium. Therefore, the required temperature compensation is much less.

The invention will further be understood from the following description when considered with reference to the accompanying drawing, and its scope is pointed out in the appended claims.

In the drawings:

FIG. 1 is a sectional view, in elevation, of a cylindrical accelerometer device embodying the invention, and FIG. 2 is a schematic diagram showing a modification in the control circuitry adapted to be connected with the accelerometer of FIG. 1 further in accordance with the invention.

Referring to the drawings, in which like elements are designated by like reference numerals, and referring particularly to FIG. 1, a cup-shaped cylindrical outer protective casing or cover element 5 is provided with a base plate or closure element 6 therefor. The casing may be of any suitable material while the base plate 6 is preferably of insulating material as indicated, and is provided with a step or shoulder on which is tightly seated an inner casing 7 of the same shape as the outer casing 5. The inner and outer casings or cover elements are spaced apart at all points except at the base end where they are joined to the common carrier or base 6. A plurality of air vents or openings 10 and 11 near the base and at the inner end, respectively, are provided through the walls of the inner casing to provide air communication and air flow through from the inner casing to the outer casing through the chamber 8.

The two casings are cylindrical in form to act as guide means for inner elements as well as for easier manufacture and assembly and may be considered to be of this type in the present example. In any case, the inner casing acts as a cylinder for guiding an inner inertial operating element or piston 12 which fits freely therein with slight clearance for unimpeded smooth axial movement. This is the center axis of the device and is oriented in operation with (AA) the axis of movement or flight of the vehicle by which the device is carried.

The piston or piston element 12 is held in a seated position at the inner end of the casing 7 against a stop element in the form of an annular ring 13 integral with or attached to the inner end at the center of the inner casing 7 as indicated. It is preferably formed integral therewith if the material admits of that type of construction, as when the device contains molded parts of plastic material or the like. Within the confines of the stop element 13 a coiled flexible conductor 15 is connected electrically with the piston 12 as indicated at 16 and threaded through suitable aligned openings in the casings to extend exteriorly of the device.

As indicated at 17, the conductor 15 joins with an insulated conductor 17 extending exteriorly of the casing. This may be of any suitable length to provide connection with other apparatus forming the control circuit therefor as will be seen hereinafter. The piston 12 is held normally against the stop element 13 at the inner end of the cylinder 7 by an inertial mass or reset weight 20 which may be in the form of an elongated cylinder as indicated, and spring loaded for movement in the direction of the piston as by a coiled compression or reset spring 21 firmly seated between the outer end of the weight cylinder 20 and the base 6 and fitting smoothly within the inner cylinder of casing 7.

Also within the inner cylinder 7, and in this case within the confines of the cylindrical inertial weight 20 is an extensible and compressible bellows element 22 conforming in shape to the outer elements, that is, being cylindrical, and providing an inner air chamber 24 between the piston 12 and the outer end of the bellows which is closed to the controlled degree by metering orifice element 25 in the form of a relatively thick disk. This is tightly fitted into the end of the bellows and fixed in place centrally of the casings and in spaced relation to the base element 6.

The fixed spacing is provided by a central pedestal extending from the base to and through the orifice element 25, and comprising temperature compensating conductive spring 28 extending from the base 6 coaxially along the axis AA and contacting or connecting with a shouldered conductive contact element or pin 29. The latter extends axially through the orifice element 25 into the inner chamber 24 in alignment with a second contact element or pin 30 carried by the piston element 12 and connected electrically therewith. A second insulated electrical conductor, corresponding to the conductor 17, is connected with the compensating spring element as indicated at 32 and the contact pin 29. This conductor extends exteriorly of the device through the base element 6 to connect with control circuits along with the conductor 17 and will hereinafter appear.

The size or diameter of the contact element 29 extending through the orifice element 25 determines the size or effective area of the orifice which is constructed of a porous material such as sintered bronze or the like. A larger size contact for reducing the orifice size or metering area is indicated in dotted outline at 29A and is shown only by way of example as indicating the range of size of the contact 29 that may be used for this purpose.

A feature of this construction over other similar components or orifice elements is the sintered-bronze porous orifice which can be calibrated much more quickly than an orifice which has to be machined or drilled. Also by merely making the bronze metering area larger or smaller by enlarging the contact 29 as above described the device can be made applicable to the great majority of missile and other vehicle applications.

The need for strict tolerance requirements on the bore-piston fit has been eliminated by the use of a bellows which may be of flexible plastic or rubber material. In general the unit throughout is so constructed that it may be manufactured at relatively low cost and easily assembled without in any way affecting the accuracy of its own operation.

The operation is as follows: Upon experiencing missile or like acceleration along the axis AA, the inertia of the weight or mass 20 causes it to drive the reset spring 21 to a solid height condition against the base 6, thereby freeing the piston 12 to try to follow the weight or mass 20. The air contained between the piston 12 and the porous orifice element 25 is forced out through the porous bronze at a rate dependent upon the vehicle acceleration.

The overall result is a device that integrates acceleration to yield velocity which can be used as a safe velocity or distance base measurement. The utilization of air as a damping medium has the advantage that the viscosity change of air with temperature is very much smaller than that of any oil medium and the required temperature compensation is much less, as hereinbefore noted.

Reset in the event that acceleration is not maintained, such as a condition which would be the result of shipping and handling shocks, would be accomplished by the reset spring 21 to its stop 13. Because of the reset spring not being attached directly to the piston, the device becomes a pure integrator and not a proportional device which is a characteristic of other devices of this type in the field.

As the piston moves to compress the bellows and force the air through the orifice element 25, the resulting compression of the air in the inner casing 7 is relieved through the air vents 10 into the chamber 8 and thence to the other side of the piston as it moves. In this case, the vents 11 act as inlet vents and the vents 10 as outlet vents. When the piston is reset, the vents 11 then exhaust the air from the chamber within the inner casing 7 into the outer casing and the chamber 8 and thence through the vents 10 which act as inlet vents to refill the lower end of the casing on the opposite side of the piston. The size of the air vents 10 and 11 is such that free movement of the piston is provided except for the restraint provided by the size of the orifice element 25.

The piston can also be converted to a linear potentiometer to provide a variable voltage source and a voltage output which may be taken as a direct measure of the acceleration time or velocity characteristic of the vehicle or other carrier.

Referring to FIG. 2, the electrical circuit connections which provide the means referred to are shown in connection with the accelerometer device of FIG. 1. The latter is in outline form with the essential operating elements in proper relation and identified with FIG. 1 by the same reference numerals.

The interior of the apparatus includes a potentiometer device comprising the resistor element 35 and the usual moving contact 36. The latter is connected with the conductive piston 12 as indicated and through the piston 12 to the output lead 17. The potentiometer resistor 35 is connected to the terminals of a voltage source such as a battery 37 having terminals 38 and 39. The terminal 38 is connected through a supply lead 40 with the potentiometer at the low potential or upper end as viewed in the drawing. The terminal 39 is connected with the high potential end of the potentiometer through a supply lead 31, the compensating spring network 28 and the contact pin 29 as indicated.

Also connected with the voltage source or battery 37, is a controlled apparatus or function 49 responsive to voltage applied thereto through contacts 41 and 42 of a relay device 23 and leads 48 and 50. The relay may be of the usual type having an operating coil 44 connected in circuit between the lead 17 and the lead 45, the latter being connected with the lead 40 as indicated.

Also connected between the lead 17 and the lead 40 at the terminal 38, is the operating coil 55 of a recording voltmeter 56 through connection leads 52 and 53 respectively. The movable stylus element 57 of the recording volt-meter, which is actuated by the operating coil 55, provides on a moving tape 58 a trace as indicated at 59 in response to the voltage variations received from the potentiometer 35–36. The trace may have a predetermined operating range, as indicated, between the zero or rest position of the stylus 57 and a maximum point 60 on the trace. The shape and width of the trace may vary under different operating conditions as a trace shown only by way of example to indicate that the voltage variations may be recorded as a measure of the velocity of the vehicle in motion.

The operation of the system is as follows: assuming the voltage supply source 37 to be connected and the accelerometer in motion along the axis AA, the piston 12 is released to follow the motion of the motion of the vehicle by the inertial movement of the mass or reset weight 20 away from it. The piston, as an inertial mass, is moved toward the orifice end of the bellows 22, compressing the air in the chamber 24 and causing it to flow at a metered rate through the orifice 25 as in the device of FIG. 1. Movement of the potentiometer contact 36 resulting from different rates of acceleration and changes causes the voltage applied thereto and to the lead 17 to vary with respect to that of the leads 40 and 45, since the potentiometer resistor 35 is connected effectively in parallel or across the battery or voltage source 37 and the leads 40 and 45 are connected in common with the low side of the potentiometer resistor 35 to the terminal 38. This increased and variable voltage therefore is also applied to the operating coil 55 of the recorder 56, resulting in a graphic picture of the voltage variations and peaks as indicated by the curve 59 thereon. When the voltage reaches a predetermined limit, as at the point 60 on the curve 59, the relay winding 44 is energized to the point where the relay operates to close the contacts 42 and 41, thereby completing a circuit from the battery or voltage source 37 to the controlled apparatus or function 49 and causing it to operate. In the case of a pair of contacts 30 and 29 under direct control as in FIG. 1, this occurs when the contacts close to complete a similar circuit to actuate the controlled apparatus or function in the same manner as the contacts in the relay in the circuit diagram of FIG. 2.

In either case, upon acceleration of the device of FIG. 1 in the direction of the acceleration axis, the inertia of the reset weight or inertial mass 20, preferably in the form of a cylindrical plunger as indicated, causes it to drive the reset spring 21 to a solid height condition thereby freeing the piston 12 to follow the weight 20. The air contained or in the bellows 22 is forced out through the orifice 25 at a metered rate dependent on the vehicle acceleration as pointed out hereinbefore. The device thus integrates acceleration to yield velocity of the vehicle in motion and the recorder or other indicating scale may be calibrated in units indicative of degree of movement rather than volts. Because the device is not spring actuated this accelerometer device becomes a pure integrator and not a proportional device which is a characteristic of other devices known in the industry. At the same time the structure is relatively simple and of low cost to manufacture, and is easily assembled and disassembled.

We claim:

1. An integrating accelerometer device comprising in combination, an extensible and compressible bellows element providing an interior air compression chamber, an inertially-movable circular piston element connected at one end of said bellows element to move therewith and provide a compressing force thereon, a porous orifice element providing a closure for the opposite end of said bellows element, said bellows and piston elements with the orifice element being mounted in coaxial relation, an open-ended cylindrical casing providing a guiding element and inner end stop means for the piston element, a base forming a closure for the opposite outer end of said casing, an axially-movable tubular inertial weight guided and enclosed by said casing and contacting said piston in abutting end relation in a normal position of rest, a spring of the coiled compression type connected between said reset weight and said base to retain said weight at rest in contact with said piston element, temperature-compensating pedestal means connected with the base and extending axially of said casing, means providing a connection between said pedestal means and said porous orifice element centrally thereof to hold the latter in fixed position with respect to the base as said piston moves upon release of said weight in response to inertial movement, said last named means providing a limitation on the operative area of said orifice to predetermine the timing rate of movement of the piston in response to air compression, a controlled apparatus responsive to predetermined operating voltage, means providing a source of said operating voltage, and means connected with the piston and responsive to its movement providing a circuit controlling connection between said voltage source and said controlled apparatus to effect operation of the latter in response to movement of said piston under a predetermined condition of acceleration.

2. An integrating accelerometer comprising in combination a circular piston element having inertial mass, a casing providing an operating cylinder for said piston and a seat at an inner end thereof for said piston and a base element at the other end, said piston and cylinder elements being mounted in coaxial relation along a common axis adapted to be aligned in operation with the axis of acceleration of said device, a compressible and extensible cylindrical bellows element connected at one end with said piston for movement therewith and extending coaxially therefrom within said casing, a porous flat disc providing an orifice element and a closure means for the opposite end of said bellows element, means providing a temperature-compensated pedestal connection between said base element and said orifice element, electrically-conductive means carried by said orifice element for electrical circuit control and for blanking a central portion thereof to a predetermined degree thereby to limit the orifice area and its timing rate in operation, means providing a spring-loaded inertial reset weight contacting said piston element and holding it normally against said seat, and electric circuit control means connected with said piston element and operative in response to movement thereof beyond a predetermined limit to effect a control operation with said electrically conducting means indicating attainment of a predetermined rate or degree of acceleration.

3. An integrating accelerometer as defined in claim 2, wherein the orifice disc is of porous sintered bronze material, and wherein the electrically-conductive and circuit control means include aligned contact elements within the bellows jointly carried by the piston and the orifice blanking means and having external control circuit connection means provided therefor.

4. An integrating accelerometer device, comprising in combination, a flexible-walled cylindrical bellows element providing an interior air compression chamber, an inertially-movable circular piston element connected at one end of the bellows element to move therewith coaxially and provide a compression force thereon, a fixed flat porous orifice disk of sintered material providing a closure means for the opposite end of said bellows element, said bellows and piston elements with the orifice disc being aligned in coaxial relation for orientation with an axis of acceleration and movement in operation, a first electrical contact means carried by said orifice disk for electrical circuit control and for blanking a central portion thereof thereby to limit the orifice area and its timing rate in operation, an axially-movable tubular inertial reset weight surrounding said bellows element in coaxial spaced relation thereto in a normal position of rest and contacting said piston element in abutting relation thereto, a coiled compression-type reset spring contacting said inertial reset weight in abutting end-to-end coaxial relation thereto for retaining said weight at rest in contact with said piston element, and a second electrical contact means connected with said piston element and responsive to its movement for engaging said first contact means and effecting said electrical circuit control in response to and indicating a predetermined condition of acceleration and movement in operation.

References Cited
UNITED STATES PATENTS

| | | | |
|---|---|---|---|
| 2,659,589 | 11/1953 | Hickman | 73—503 XR |
| 2,850,590 | 9/1958 | Marks et al. | 200—61.53 |
| 2,854,539 | 9/1958 | Ruppel | 200—61.45 |
| 2,909,364 | 10/1959 | Stedman | 73—516 XR |
| 2,950,908 | 8/1960 | Rainsberger et al. | 73—503 |
| 3,083,276 | 3/1963 | Sear et al. | 200—61.45 |

JAMES J. GILL, *Primary Examiner.*